United States Patent
Schulz et al.

(10) Patent No.: US 10,322,385 B2
(45) Date of Patent: Jun. 18, 2019

(54) MIXING DEVICE FOR TWO COMPONENT POLYURETHANE FOAM FORMULATION

(71) Applicant: Dow Global Technologies LLC, Midland, MI (US)

(72) Inventors: Peter J. Schulz, Midland, MI (US); Matthew J. Turpin, Midland, MI (US); Gregory T. Stewart, Midland, MI (US); Laura J. Dietsche, Midland, MI (US); Daniel A. Beaudoin, Midland, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 356 days.

(21) Appl. No.: 14/908,040

(22) PCT Filed: Sep. 2, 2014

(86) PCT No.: PCT/US2014/053641
§ 371 (c)(1),
(2) Date: Jan. 27, 2016

(87) PCT Pub. No.: WO2015/038364
PCT Pub. Date: Mar. 19, 2015

(65) Prior Publication Data
US 2016/0175788 A1    Jun. 23, 2016

Related U.S. Application Data

(60) Provisional application No. 61/878,104, filed on Sep. 16, 2013.

(51) Int. Cl.
*B01F 5/00*    (2006.01)
*B01F 5/06*    (2006.01)
(Continued)

(52) U.S. Cl.
CPC ........ *B01F 5/0602* (2013.01); *B01F 3/04446* (2013.01); *B01F 5/0619* (2013.01);
(Continued)

(58) Field of Classification Search
CPC .. B01F 3/04446; B01F 5/0602; B01F 5/0619; B01F 2005/0627; B01F 2005/0637;
(Continued)

(56) References Cited

U.S. PATENT DOCUMENTS 3,769,232 A    10/1973  Houldridge
3,799,403 A     3/1974  Probst et al.
(Continued)

FOREIGN PATENT DOCUMENTS

DE    3400309    8/1985
FR    1479496    5/1967
(Continued)

OTHER PUBLICATIONS

Search report from corresponding European 14762207.0-1706 application, dated May 9, 2017.
(Continued)

*Primary Examiner* — Anshu Bhatia
(74) *Attorney, Agent, or Firm* — Dow Global Technologies LLC

(57) ABSTRACT

A mixing device (10) containing a housing (20) that defines a mixing chamber (30), an A-component feed channel entrance opening (40), a B-component feed channel entrance opening (50), and air feed channel entrance opening (60), and an exit opening (70) where the feed channel entrance openings and exit opening provide fluid communication into and/or out of the mixing chamber, and a static mixing element (80) housed within the mixing chamber between the three entrance feed channels and the exit opening, wherein the air feed channel entrance opening
(Continued)

having a cross sectional area that is 0.7 square mm or greater and 7.7 square mm or less.

9 Claims, 2 Drawing Sheets

(51) Int. Cl.
  *B29B 7/74* (2006.01)
  *B29C 67/24* (2006.01)
  *B01F 3/04* (2006.01)
  *B29K 75/00* (2006.01)

(52) U.S. Cl.
  CPC .......... *B29B 7/7419* (2013.01); *B29C 67/246* (2013.01); *B01F 2005/0627* (2013.01); *B01F 2005/0637* (2013.01); *B01F 2215/0039* (2013.01); *B29K 2075/00* (2013.01)

(58) Field of Classification Search
  CPC ........... B01F 2215/0039; B29B 7/7419; B29C 67/246; B29K 2075/00
  See application file for complete search history.

(56) References Cited

U.S. PATENT DOCUMENTS

| | | | |
|---|---|---|---|
| 4,132,838 A | | 1/1979 | Kreuer et al. |
| 4,275,172 A | | 6/1981 | Barth |
| 4,310,493 A | | 1/1982 | Pisaric |
| 4,370,062 A | * | 1/1983 | Moody ................ B01F 5/0618 138/42 |
| 4,838,699 A | | 6/1989 | Jour et al. |
| 5,053,202 A | * | 10/1991 | Dwyer ................ B01F 5/0612 366/336 |
| 5,302,325 A | | 4/1994 | Cheng |
| 5,472,990 A | | 12/1995 | Craig |
| 5,529,245 A | * | 6/1996 | Brown ................ B05B 7/1209 239/390 |
| 5,810,956 A | | 9/1998 | Tanis |
| 6,021,961 A | | 2/2000 | Brown |
| 6,027,241 A | | 2/2000 | King |
| 6,271,275 B1 | | 8/2001 | Malwitz |
| 6,280,692 B1 | | 8/2001 | Bartlett |
| 6,326,413 B1 | | 12/2001 | Blackwell |
| 7,527,172 B2 | | 5/2009 | McMichael |
| 7,534,347 B2 | | 5/2009 | Sugiura |
| 9,283,578 B2 | | 3/2016 | Kim et al. |

FOREIGN PATENT DOCUMENTS

| | | |
|---|---|---|
| JP | 1982062019 U | 4/1982 |
| JP | 1986118164 A | 6/1986 |
| JP | 1993220768 A | 8/1993 |
| JP | 2003206419 A | 7/2003 |
| JP | 2011098552 A | 5/2011 |

OTHER PUBLICATIONS

Search report from corresponding Chinese 201480048735.X application, dated Nov. 17, 2016.

Office Action from corresponding Japanese 2016-540302 application, dated Feb. 24, 2017.

* cited by examiner

MIXING DEVICE FOR TWO COMPONENT POLYURETHANE FOAM FORMULATION

BACKGROUND OF THE INVENTION

Field of the Invention

The present invention is a mixing device suitable for mixing and applying two component polyurethane foam formulations.

Introduction

Two component polyurethane (2CPU) foam formulations are typically applied by feeding an isocyanate component (A-Component) with a polyol component (B-Component) to create a mixture and then spraying the mixture from a dispenser. There are two types of 2CPU foam formulations: frothed and non-frothed. Frothed foam formulations use a gaseous blowing agent (GBA) such as HFC-134 in the A-Component and a both a GBA and liquid blowing agent (LBA) in the B-Component. Frothed foam can be dispensed at low pressures (less than two megaPascals (MPa)) through a static mixer. In contrast, non-frothed 2CPU foam formulations are free of blowing agents in the A-Component and only have LBA in the B-Component. Non-frothed 2CPUs are dispensed at high pressures, typically 5.5-10 MPa and at an elevated temperature. When dispensing non-frothed 2CPU foam formulations the A and B components are mixed and atomized during application by high pressure impinging contact of the two Components. The high pressure accompanied by heating of non-frothed 2CPU foam formulations necessitates expensive mixing and dispensing devices that can tolerate the pressure and temperature requirements.

It is desirable to reduce the necessary pressure for non-frothed 2CPU foam formulations during mixing and application to less than two MPa, thereby eliminating the need for applicators that are robust at pressures in excess of 5 MPa as is typically required.

BRIEF SUMMARY OF THE INVENTION

The present invention solves the problem of effectively mixing and applying a non-frothed 2CPU foam formulation using a pressure of less than 5 MPa. The mixing device of the present invention enables mixing and applying non-frothed 2CPU foam formulations, that is, 2CPU foam formulations that are free of GBAs in the A-Component of the formulation at pressures of less than 5 MPa.

To solve this problem, the present invention provides a mixer design that carefully controls influx of air into the A and B Components as the A and B Components are combined and then directs the mixture of air and A and B Components through static mixers prior to applying the 2CPU form formulation to a desired substrate. The mixing device is of a design particularly well suited for injection molding thereby providing for a relatively low-cost device that can be made entirely of plastic.

In a first aspect, the present invention is a mixing device comprising: (a) a housing that defines a mixing chamber, an A-Component feed channel entrance opening, a B-Component feed channel entrance opening, and air feed channel entrance opening, and an exit opening where the feed channel entrance openings and exit opening provide fluid communication into and/or out of the mixing chamber; and (b) a static mixing element housed within the mixing chamber between the three entrance feed channels and the exit opening; where the mixing device is further characterized by the air feed channel entrance opening having a cross sectional area that is 0.7 square millimeters or greater and 7.7 square millimeter or less.

In a second aspect, the present invention is a process for dispensing a non-frothed two-component polyurethane foam formulation using the mixing device of the first aspect, the process comprising feeding an A-Component comprising an isocyanate and that is free of liquid blowing agent through the A-Component feed channel while feeding a B-Component comprising a polyol through the B-Component channel and while feeding air through the air feed channel, mixing the A- and B-Components with air in the mixing chamber and dispensing them through the exit opening.

The mixing device of the present invention is useful for preparing and applying non-froth 2CPU foam formulations according to the process of the present invention.

BRIEF DESCRIPTION OF THE DRAWINGS

FIGS. 1 and 2 illustrate side cross sectional views.

FIG. 3 illustrates a cut-away view above the entrance feed channel openings.

FIG. 4 illustrates a view of the cross sectional area of the air feed channel entrance opening.

DETAILED DESCRIPTION OF THE INVENTION

Figure 1:
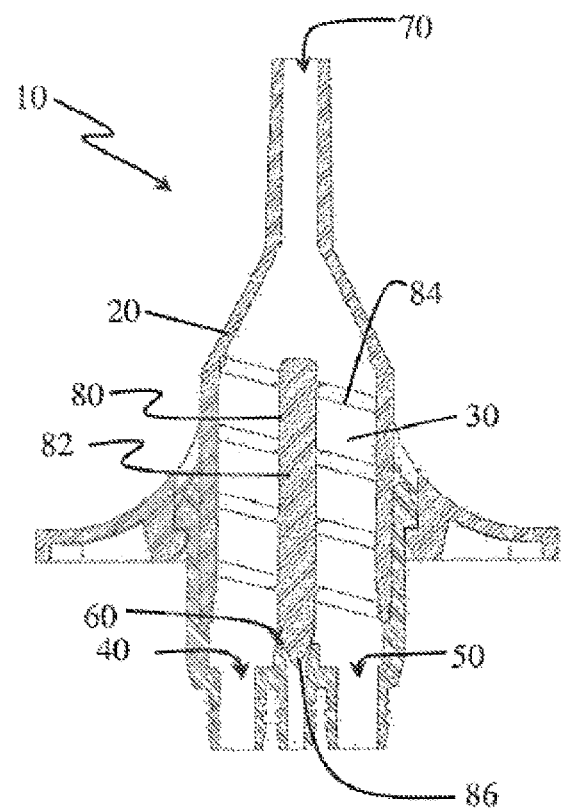
FIGS. 1-4 illustrate an exemplary mixing device of the present invention.

"And/or" means "and, or as an alternative". All ranges include endpoints unless otherwise indicated. "Multiple" means two or more.

The mixing device of the present invention comprises a housing. The housing defines a mixing chamber, three feed channel entrance openings and an exit opening. The three feed channel entrance openings are an A-Component feed Channel entrance opening, a B-Component feed channel opening and an air feed channel entrance opening. The three feed channel entrance openings and the exit opening each provides fluid communication into and/or out from the mixing chamber of the housing. The mixing device allows for fluid (that is, gas and/or liquid) flow through the feed channel entrance openings into the mixing chamber and out from the mixing chamber through the exit opening.

Preferably, the exit opening is located generally opposite from the three entrance openings such that most of the mixing chamber volume resides between the feed channel entrance openings and the exit opening. For example, in one desirable design, the housing and mixing chamber are generally cylindrical in shape with a cross sectional shape that can be circular or any other shape including oval, rectangular, pentagonal or star shaped. The entrance openings are located at one end of the cylinder and the exit opening at the opposing end of the cylinder. In such an embodiment it is further desirable for the air channel entrance opening to be generally centrally located on one end of the cylindrical housing and mixing chamber. It is also desirable for the exit opening to be generally centrally located on an end of the housing and mixing chamber opposite from the air channel entrance opening regardless of whether the air channel entrance opening is centrally located on its end or not.

Each entrance opening has a cross sectional area. Determine cross sectional areas in a plane perpendicular to the direction of fluid flow. Cross sectional areas for the A-Component and B-Component entrance openings correspond to the smallest cross sectional area of each feed channel.

Determine the cross sectional area for the air feed channel entrance opening where the outer sides (walls) that define the opening penetrate furthest into the mixing chamber (that is, furthest into the housing). The cross sectional area of the air feed channel entrance opening corresponds to the open area of the feed channel entrance opening taking into account any protrusions that extend into the air feed channel from inside the mixing chamber. For example, in a preferred embodiment as described below, a conical feature extends into the air feed channel so as to reduce the open area of the feed channel and to disperse the air flow around the conical feature. The cross sectional area of the air channel opening is the open area around the conical feature (and any supports for the conical feature as described below) within the air channel opening as determined in a cross sectional view taken through the conical feature in a plane where the outer sides of the opening penetrate furthest into the mixing chamber and perpendicular to fluid flow through the air channel prior to (which is equivalent to in an absence of) the conical feature.

The air channel entrance opening has a cross sectional area of 0.5 square millimeters ($mm^2$) or more, preferably 0.7 $mm^2$ or more, still more preferably 1.0 $mm^2$ or more and can be 1.5 $mm^2$ or more, 2.0 $mm^2$ or more and even 3 $mm^2$ or more. At the same time, the air channel entrance opening has a cross sectional area of 8.0 $mm^2$ or less, preferably 7.7 $mm^2$ or less, still more preferably 7.5 $mm^2$ or less, yet more preferably 7.0 $mm^2$ or less and can be 6.5 $mm^2$ or less, 6.0 $mm^2$ or less, 5.0 $mm^2$ or less, 4.0 $mm^2$ or less, even 3.0 $mm^2$ or less. Ideally, the air channel entrance opening has a cross section area of 0.7 $mm^2$ or more and 7.7 $mm^2$ or less. When the air channel entrance opening has a cross sectional area of less than 0.5 $mm^2$ the air flow can be too restricted to adequately disperse the polyurethane foam formulation. When the air channel entrance opening has a cross sectional area of greater than 8.0 $mm^2$ there is a tendency for A-Component and/or B-Component to undesirably back flow into the air feed channel.

The A-Component entrance opening has a cross sectional area that is desirably 0.5 or more, preferably 1.0 times or more, still more preferably 1.5 times or more, yet more preferably 2.0 times or more, yet even more preferably 3.0 times or more and can be 4 times or more, 5 times or more, 6 times or more 7 times or more, 8 times or more, 9 times or more and even 10 times or more the size of the air channel entrance opening cross sectional area. At the same time, the A-Component entrance opening desirably has a cross sectional area that is desirably 16 times or less, preferably 15.5 times or less, more preferably 13 times or less and can be 12 times or less, 11 times or less, 10 times or less and even 9 times or less the size of the air channel entrance opening cross sectional area. A first cross sectional area is "x" times the size of a second cross sectional area if the first cross sectional area has a cross sectional area that is equal to the product of x and the second cross sectional area. When the A-Component entrance opening has a cross sectional area that is less than 0.5 times the size of the air channel entrance opening cross sectional area then air flow can inhibit adequate flow of the A-Component. When the A-Component entrance opening has a cross sectional area that is greater than 16 times the size of the air channel entrance opening cross sectional area then there may be insufficient air to properly disperse the polyurethane foam formulation.

The B-Component entrance opening has a cross sectional area that is desirably 0.7 times or more, preferably 1.0 times or more, still more preferably 2.0 times or more, more preferably 2.1 times or more, yet more preferably 3.0 times or more and can be 4 times or more, 5 times or more, 10 times or more 15 times or more, and even 20 times or more the size of the air channel entrance opening cross sectional area. At the same time, the B-Component entrance opening desirably has a cross sectional area that is 25 times or less, preferably 23 times or less, more preferably 22 times or less and can be 20 times or less, 15 times or less and even 10 times or less the size of the air channel entrance opening cross sectional area. When the B-Component entrance opening has a cross sectional area that is less than 2.0 time the size of the air channel entrance opening cross sectional area then air flow can inhibit adequate flow of the B-Component. When the B-Component entrance opening has a cross sectional area that is greater than 25 times the size of the air channel entrance opening cross sectional area then there may be insufficient air to properly disperse the polyurethane foam formulation.

It is further desirable for the B-Component entrance opening to have a larger cross sectional area than the A-Component entrance opening cross sectional area. The B-Component is generally more viscous than the A-Component so having a larger B-Component entrance opening facilitates achieving a properly balanced flow rate and mixing ratio of the A- and B-Components.

The mixing device further comprises a static mixing element housed within the mixing chamber between the three entrance feed channel openings and the exit opening. That means that at least a portion of, preferably all of, the static mixing element resides between the exit opening and the three entrance openings (though not necessarily between any two entrance openings). The static mixing element is designed so to mix together fluids flowing into the mixing chamber from the entrance openings to form a mixture of fluids prior to that mixture flowing out from the mixing chamber through the exit opening.

In one desirable design, the static mixing element comprises multiple semi-elliptical plates positioned in series along a central support that extends in a direction extending between the entrance openings and the exit opening where the semi-elliptical plates are tilted out of planar with respect to a cross sectional plane through the central support.

In one desirable mixing device, the static mixing element comprises a central support with a conical feature at an end with the conical feature penetrating into but not sealing off the air channel entrance opening. Even more desirably, the air channel is flared into a cone shape itself into which the conical feature penetrates. Alternatively, another desirable design includes a conical feature that is distinct from a central support of a static mixing element penetrating into but not sealing off the air channel entrance opening.

It is valuable for achieving consistent and controlled mixing that the air channel entrance opening cross sectional area and shape remain as constant as possible during use of the mixing device. Therefore, it is desirable for a conical feature that penetrates in to the air channel entrance opening to be held in place so as to avoid movement relative to the air entrance channel. In one desirable embodiment, a conical feature (as part of a central support of the mixing element or otherwise) is held into place with respect to the air channel entrance opening by fins, preferably three or more fins evenly spaced around the conical feature, that contact a wall defining the air channel entrance opening. Such fins prevent the conical feature from moving radially within the air channel entrance opening in the cross sectional plane of the air channel entrance opening. The fins can be attached to the wall defining the air channel entrance opening or merely touch the wall without attaching to the wall.

An example of one desirable embodiment of the mixing device of the present invention is illustrated in FIGS. 1-4.

FIG. 1 shows a cross sectional view of mixing device 10 where the viewing cross section extends in a plane that extends from the entrance openings to the exit opening and is perpendicular to the cross sections containing the cross sectional areas of the entrance openings. Housing 20 defines mixing chamber 30, A-Component feed channel entrance opening 40, B-Component feed channel entrance opening 50, air feed channel entrance opening 60 and exit opening 70. Mixing device 10 comprises static mixing element 80, which comprises central support 82, semi-elliptical plates 84 and conical feature 86. Housing 20 and mixing chamber 30 are generally cylindrical in shape with entrance openings 40, 50 and 60 on one end and exit opening 70 on an opposing end.

Figure 2:
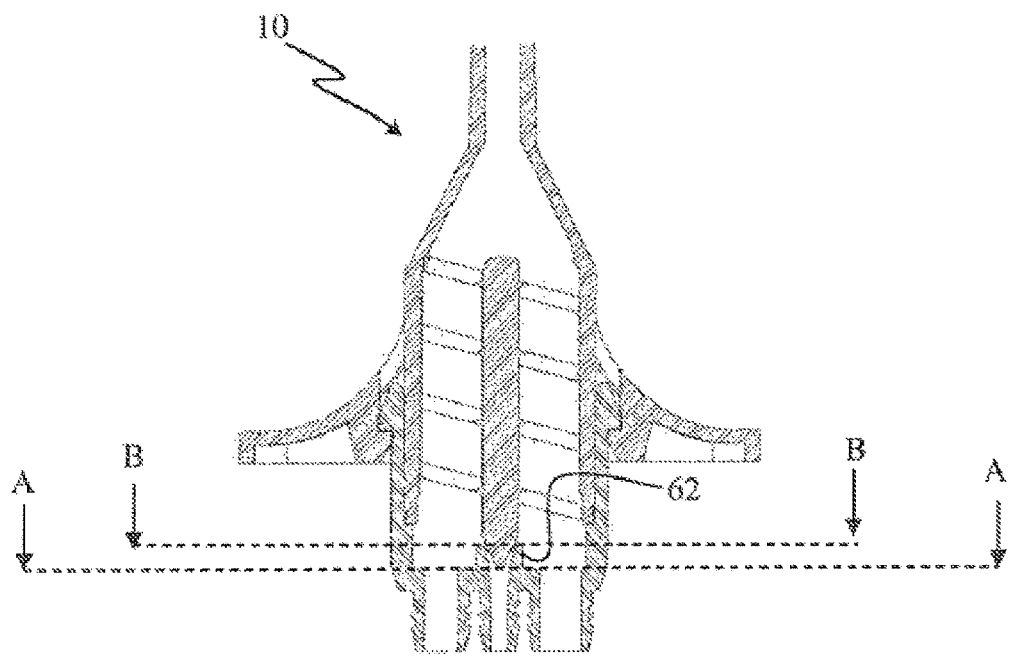

FIG. 2 again illustrates mixing device 10 in like perspective as FIG. 1. FIG. 2 identifies walls 62 that define air feed channel entrance opening 60 (shown in FIG. 1). FIG. 2 also identifies viewing plane A and viewing plane B in which entrance opening cross sectional areas are determined. Determine the A-Component and B-Component feed channel entrance opening cross sectional areas in viewing plane A, which corresponds to the narrowest portion of the feed channels. Determine air feed channel entrance opening cross sectional area in viewing plane B, which is where the outer sides (walls 62) of the air feed channel entrance opening penetrate furthest into mixing chamber 30.

Figure 3:
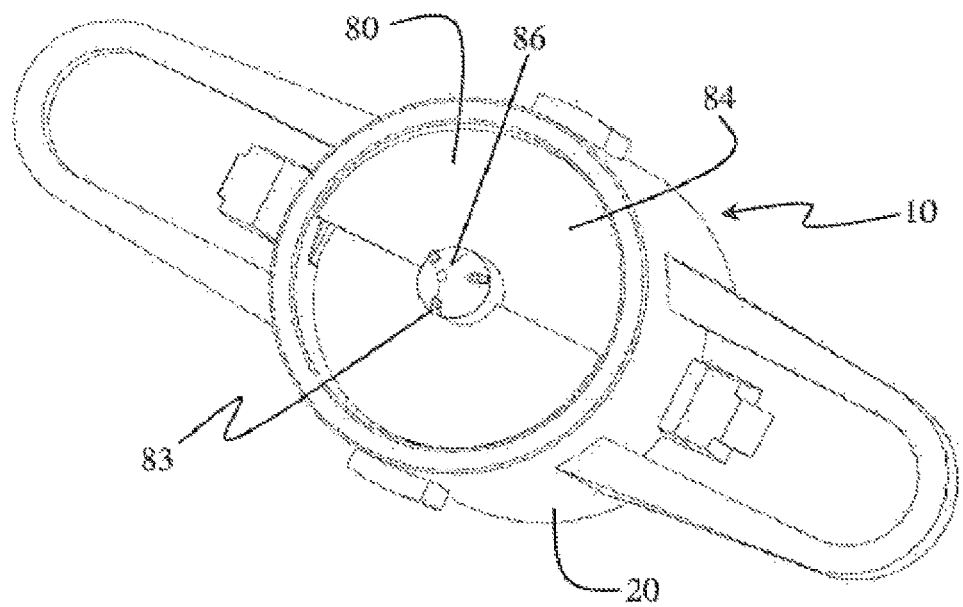

FIG. 3 provides yet another view of mixing device 10 as an angled view towards mixing element 80 from viewing plane A (that is, viewed in the opposite direction as the viewing arrows indicate for viewing plane A in FIG. 2). The view of FIG. 3 reveals three fins 83 on conical feature 86 of mixing element 80. Fins 83 rest against walls 62 of the air feed channel entrance opening and hold conical feature 86 from moving within the air feed channel entrance opening.

Figure 4:
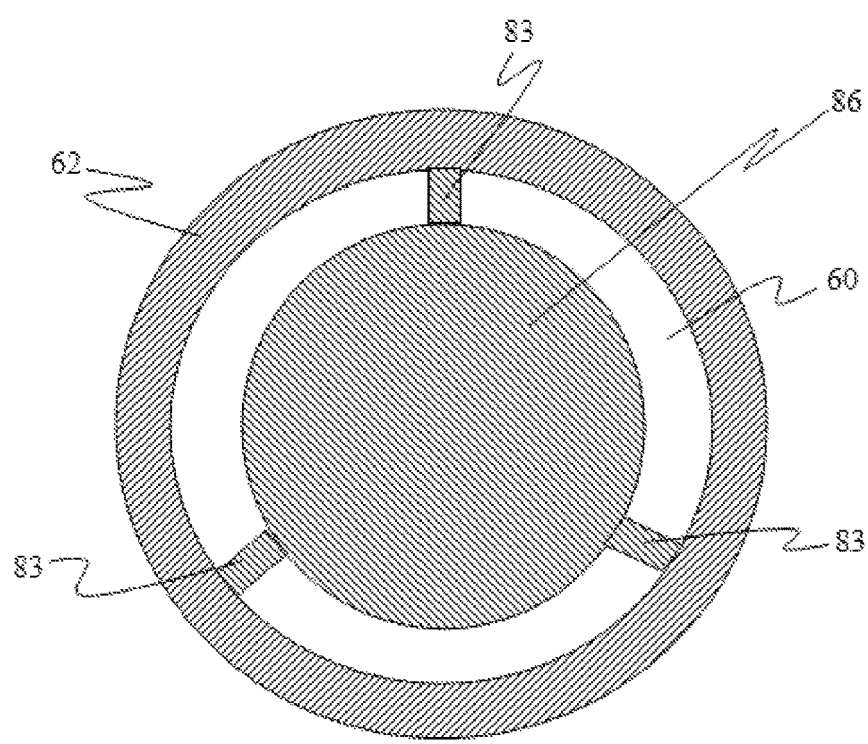

In the exemplary mixing device of FIGS. 1-3 the A-Component and B-Component feed channel entrance opening cross sectional areas are circular in shape. The cross sectional area of A-Component feed channel entrance opening 40 is 11.3 mm$^2$ and the cross sectional area of B-Component feed channel entrance opening 50 is 16.4 mm$^2$. Air feed channel entrance opening 60 is similar to the cross section of a toroid with three sections blocked due to fins 83. FIG. 4 illustrates the cross sectional view that reveals air feed channel entrance opening 60. The air feed entrance opening cross sectional area is 3.85 mm$^2$.

FIG. 4 illustrates the cross sectional view of the air feed channel entrance opening cross sectional area as viewed down viewing plane B of FIG. 2. The air feed channel entrance opening cross sectional area is that of the air feed channel entrance opening 60 that remains open around conical feature 86, fins 83 and within wall 62.

The present invention includes a process for dispensing a non-frothed 2CPU foam formulation using the mixing device of the present invention. The process of the present invention comprises feeding an A-Component comprising an isocyanate and that is free of liquid blowing agent through the A-Component feed channel into the mixing chamber of the mixing device of the present invention while feeding into the mixing chamber a B-Component comprising a polyol through the B-component feed channel and air through the air feed channel, mixing the A- and B-Components with air in the mixing chamber to form a non-frothed 2CPU foam formulation and then dispensing the non-frothed 2CPU foam formulation through the exit opening.

Typically, the process includes providing an A-Component at a pressure in a range of 790 to 870 kiloPascals and providing a B-Component at a pressure in a range of 860 to 940 kiloPascals. Typically, provide air at a pressure of 1.5 megaPascals or less, preferably 1.4 megaPascals or less, more preferably 1.0 megaPascals or less and the air pressure can be 700 kiloPascals or less while at the same time it is typical to provide air at a pressure of 340 kiloPascals or higher, preferably 400 kiloPascals or higher, more preferably 500 kiloPascals or higher and even more preferably 550 kiloPascals or higher.

One novel characteristic of the mixing device of the present invention and the process of the present invention is that air is introduced to the A-Component and B-Components before the A- and B-Components finish interacting with the static mixing element, preferably before the A- and B-Components first contact the static mixing element.

With respect to locations within the mixing chamber, terms such as "before" and "after" are with respect to fluid flowing into the mixing chamber through the feed channel entrance openings and out from the mixing chamber from the exit opening. The three feed channel entrance openings are generally on opposite side of the mixing chamber from the exit opening. Hence, reference to "before" with respect to objects in the mixing chamber means relatively further from the exit opening while reference to "after" means generally more proximate to the exit opening.

The mixing device of the present invention has an added benefit of being able to be readily injection molded. By operating at lower pressures than typical non-frothed 2CPU foam formulation applicators the present mixing device can be manufactured entirely of plastic. The fact the mixing device can be entirely of plastic in combination with the design as set forth herein enables the mixing device to be readily injection molded. As a result, the mixing device of the present invention is cost effective (that is, relatively low cost) to manufacture relative to other non-froth 2CPU foam formulation applicators.

The invention claimed is:

1. A mixing device comprising:
    (a) a housing that defines a mixing chamber, an A-Component feed channel entrance opening, a B-Component feed channel entrance opening, and air feed channel entrance opening, and an exit opening where the feed channel entrance openings and exit opening provide fluid communication into and/or out of the mixing chamber; and
    (b) a static mixing element housed within the mixing chamber between the three entrance feed channels and the exit opening;
    where the mixing device is further characterized by the air feed channel entrance opening having a cross sectional area that is in a range of 0.7 square millimeters to 7.7 square millimeters or less and further characterized by the mixing chamber being generally cylindrical in shape and having opposing ends with the exit opening at one end and the three feed channel entrance openings at the opposing end; and wherein the static mixing element comprises a central support with a conical feature at an end with the conical feature penetrating into but not sealing off the air channel entrance opening.

2. The mixing device of claim 1, further characterized by the static mixing element comprising a series of semi-elliptical plates positioned in series along a central support with the central support extending in a general direction between the entrance openings and the exit opening.

3. The mixing device of claim 1, wherein the conical feature is held into place with respect to the air channel entrance opening by fins that contact a wall defining the air channel entrance opening.

4. The mixing device of claim 1, further characterized by the static mixing element comprises a series of semi-elliptical plates positioned along a central support and the conical feature being attached to the central support of the static mixers.

5. The mixing device of claim 1, further characterized by the entrance opening cross section area of the A-component feed channel being 0.5 times or larger and 16 times or smaller than the air feed channel entrance opening cross sectional area.

6. The mixing device of claim 1, further characterized by the entrance opening cross section area of the B-Component feed channel being 0.7 times or larger and 25 times or smaller than the air feed channel entrance opening cross sectional area.

7. The mixing device of claim 1, further characterized by the air feed channel entrance opening being generally centered on an end of the mixing chamber.

8. The mixing device of claim 7, further characterized by the static mixing element comprising a series of plates in series along a central support, the central support having a conical end that extended into but not sealing off the entrance opening of the air feed channel such that the cross sectional area left open around the conical feature corresponds to the air feed channel entrance opening cross sectional area, the conical feature having three or more fins that contact a wall defining the air channel entrance opening and serve to hold the conical feature generally centrally position in the air channel entrance opening.

9. A process for dispensing a non-frothed two-component polyurethane foam formulation using the mixing device of claim 1, the process comprising feeding an A-Component comprising an isocyanate and that is free of liquid blowing agent through the A-Component feed channel while feeding a B-Component comprising a polyol through the B-Component channel and while feeding air through the air feed channel, mixing the A- and B-Components with air in the mixing chamber before the A- and B-Components finish interacting with the static mixing element and dispensing them through the exit opening.

\* \* \* \* \*